US010185360B1

(12) United States Patent
Yang

(10) Patent No.: US 10,185,360 B1
(45) Date of Patent: Jan. 22, 2019

(54) ENGAGING MECHANISM AND TRANSMISSION DOCK AND ELECTRONIC DEVICE HAVING THE SAME

(71) Applicant: GETAC TECHNOLOGY CORPORATION, Hsinchu County (TW)

(72) Inventor: Jui-Lin Yang, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 0 days.

(21) Appl. No.: 15/808,841

(22) Filed: Nov. 9, 2017

(51) Int. Cl.
*G06F 1/16* (2006.01)
*H01R 13/639* (2006.01)

(52) U.S. Cl.
CPC ......... *G06F 1/1632* (2013.01); *H01R 13/639* (2013.01)

(58) Field of Classification Search
CPC ............................ G06F 1/1632; G06F 1/1654
USPC .......................................... 361/679.2, 679.41
See application file for complete search history.

(56) References Cited

U.S. PATENT DOCUMENTS 9,013,868 B2 * 4/2015 Kuo ...................... G06F 1/1632 361/679.43
9,256,256 B2 * 2/2016 Liang .................... G06F 1/1632
9,398,707 B2 * 7/2016 Chang .................. H05K 5/0221
9,690,332 B2 * 6/2017 Liu ....................... G06F 1/1681
2004/0190234 A1 * 9/2004 Lin ......................... G06F 1/162 361/679.28
2013/0044425 A1 * 2/2013 Lin ....................... G06F 1/1669 361/679.43
2017/0285693 A1 * 10/2017 Mori ..................... G06F 1/1616

* cited by examiner

*Primary Examiner* — Anthony Q Edwards

(57) ABSTRACT

An engaging mechanism includes a slidable engaging member, a guiding frame configured to be fixed on and protrude from a carrying surface, and a guided frame. The slidable engaging member includes a slide block, an arm disposed on the slide block and a hook portion protruding from the arm. The hook portion is covered by the guiding frame when being in a releasing position. The hook portion protrudes from one of two outer sides relative to each other of the guiding frame when being in an engaging position. When being in the releasing position, the guided frame is put on the carrying surface along a connecting direction by its two inner sides pressed against and guided by the two outer sides of the guiding frame. Then, the hook portion is moved from the releasing to the engaging position so as to be connected to the guided frame.

6 Claims, 14 Drawing Sheets

30
10
111
1113
1112
1111
115
114
113
111
1113
1112
1111
115
114
300
D
104
Y
Z
X

ENGAGING MECHANISM AND TRANSMISSION DOCK AND ELECTRONIC DEVICE HAVING THE SAME

BACKGROUND OF THE INVENTION

Field of the Invention

The present invention relates to an engaging mechanism, and more particularly, to a transmission dock and electronic apparatus having the engaging mechanism.

Description of the Prior Art

With the progressing technologies, electronic products are developed to have more humanized designs as well as being multi-purpose, so as to provide consumers with more diversified application modes. In the recent years, the availability of transformer laptop computers has yet brought the application mode of conventional laptop computers to a next level. A transformer laptop generally refers to a product integrating a tablet computer and a keyboard dock. When a user combines a tablet computer with a keyboard dock, a common conventional laptop computer application mode is formed; when a user separates the tablet computer from the keyboard dock, the tablet computer can be held and used independently. As such, a consumer needs to purchase only one single product, and requirements of functions of both a laptop computer and a tablet computer can be simultaneously satisfied.

In a conventional transformer laptop computer, a tablet computer and a keyboard dock are usually joined by means of engaging. When a tablet computer is inserted into a socket of a keyboard dock, the tablet computer first pushes open engaging hooks at the socket. When the tablet computer is completely inserted into the socket to allow slots of the tablet computer to be aligned with the engaging hooks of the keyboard dock, the engaging hooks are restored to original positions and become engaged at the slots of the tablet computer, connecting the tablet computer with the keyboard dock. However, collisions likely take place between the tablet computer and the engaging hooks when the tablet computer pushes away the engaging hooks, and the engaging hooks may then become damaged due to the collisions over an extended period of use. Further, the engaging hooks and the slots for engaging the tablet computer and the keyboard dock are generally distributed at two opposite sides of the socket. If the left and right sides of the tablet computer are not evenly and are slightly obliquely inserted into the socket of the keyboard dock, it is possible that a user start the engaging of the engaging hooks and slots when the engaging hook and slot at one of the sides are not properly aligned. Thus, in addition to not being able to be properly engaged at the slot due to the blocking of the tablet computer, the engaging hooks may also become damaged due to collisions with the tablet computer.

SUMMARY OF THE INVENTION

It is an object of the present invention to provide an engaging mechanism and a transmission dock and an electronic apparatus having the engaging mechanism, so as to solve the issue of collisions likely occurring during a connection process of slots and engaging hooks of a tablet computer and a keyboard dock in the prior art, and the issue of the incapability of detecting whether the two engaging structures are properly aligned during the connection process.

An engaging mechanism disclosed by an embodiment of the present invention is adapted to be disposed at a carrying surface, and includes at least one slidable engaging member, at least one guiding frame and at least one slidable frame. The at least one slidable engaging member includes a sliding element, an arm and a hook portion. The arm is installed at the sliding element. The hook portion protrudes from the arm. The at least one guiding frame is configured for fixing and protrudes from the carrying surface. The hook portion is covered by the at least one guiding frame when the hook portion is in a releasing state, and protrudes from one of two opposite outer sides of the at least one guiding frame when the hook portion is in an engaging state. When the hook portion is in the releasing state, two opposite inner sides of the at least one slidable frame press against the two opposite sides to locate on the carrying surface along a carrying direction, and the hook portion can switch from the releasing state to the engaging state to connect to the at least one slidable frame.

A transmission dock is disclosed by another embodiment of the present invention. At least one slidable frame on a connecting side of a first electronic device is adapted to electrically connect to the transmission dock along a carrying direction. The transmission dock includes a seat, at least one slidable engaging member and at least one guiding frame. The seat has an accommodating groove for accommodating the connecting side. The at least one slidable engaging member includes a sliding element, an arm and a hook portion. The arm is installed at the sliding element. The hook portion protrudes from the arm. The at least one guiding frame is fixedly protrudingly disposed at a carrying surface substantially located at a bottom of the accommodating groove. The hook portion is covered by the at least one guiding frame when the hook portion is in a releasing state, and protrudes from one of two outer sides of the at least one guiding frame when the hook portion is in an engaging state. When the hook portion is in the releasing state, two opposite inner sides of the at least one slidable frame press against the two opposite outer sides to locate at the carrying surface along a carrying direction, and the hook portion of the at least one slidable engaging member is actuated to engage at the at least one slidable frame.

An electronic apparatus disclosed by another embodiment of the present invention includes a transmission dock, a first electronic device and a second electronic device. At least one slidable frame on a connecting side of a first electronic device is adapted to electrically connect to the transmission dock along a carrying direction. The transmission dock includes a seat, at least one slidable engaging member and at least one guiding frame. The seat has an accommodating groove for accommodating the connecting side. The at least one slidable engaging member includes a sliding element, an arm and a hook portion. The arm is installed at the sliding element. The hook portion protrudes from the arm. The at least one guiding frame is fixedly protrudingly disposed at a carrying surface substantially located at a bottom of the accommodating groove. The hook portion is covered by the at least one guiding frame when the hook portion is in a releasing state, and protrudes from one of two outer sides of the at least one guiding frame when the hook portion is in an engaging state. When the hook portion is in the releasing state, two opposite inner sides of the at least one slidable frame press against the two opposite outer sides to locate at the carrying surface along a carrying direction, and the hook portion of the at least one slidable engaging member is actuated to engage at the at least one slidable frame.

According to the engaging mechanism and the transmission dock and electronic apparatus having the engaging mechanism disclosed by the above embodiments, during the connection process of the first electronic device and the transmission dock, by pressing the two opposite inner sides of the slidable frame on the connecting side of the first electronic device against the two opposite sides of the guiding frame, the first electronic device can be more accurately guided to an engaging position to locate the slidable frame on the carrying surface. Further, by covering the hook portion of the slidable engaging member by the guiding frame of the engaging mechanism, the slidable engaging member can be prevented from direct collisions with the first electronic device and hence from damages.

The above description above and the following embodiments of the present invention are for demonstrating and explaining the principle of the present invention, and further describe the claim scope of the present invention.

DETAILED DESCRIPTION OF THE EMBODIMENTS

Detailed characteristics and advantages of the embodiments are described in detail in the embodiments below. One person skilled in the art can understand the technical contents based on the details of the description and accordingly implement the present invention based on these details. Further, one person skilled in the art can easily appreciate the objects and advantages according to the contents, claims and drawings of the application. The embodiments are for further describing perspectives of the present invention, and are not to be construed as limitations to the present invention.

Figure 1:
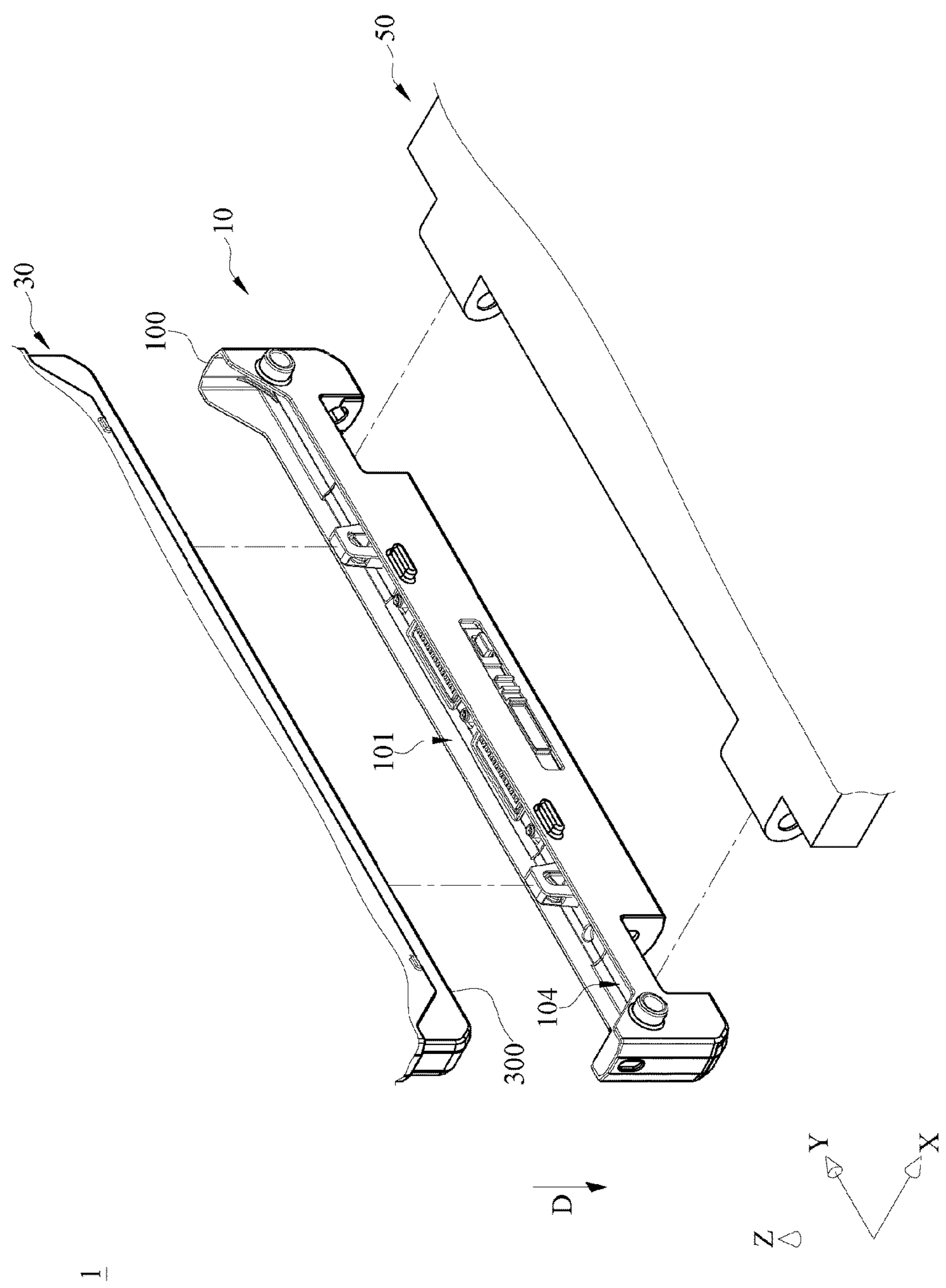
FIG. 1 is a perspective schematic diagram of an electronic apparatus according to an embodiment of the present invention.
Figure 2A:
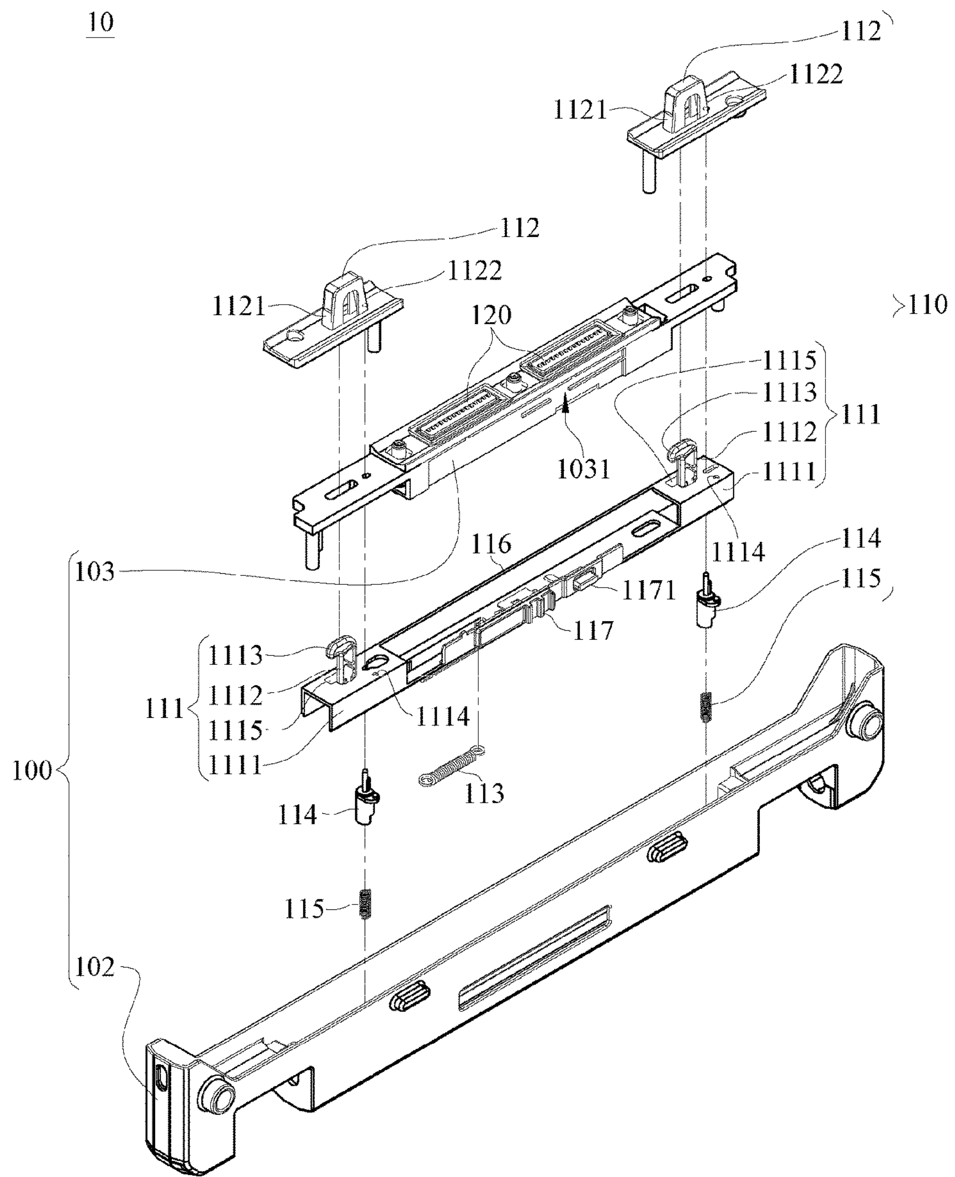
FIG. 2A is an exploded schematic diagram of a transmission dock in FIG. 1.
Figure 2B:
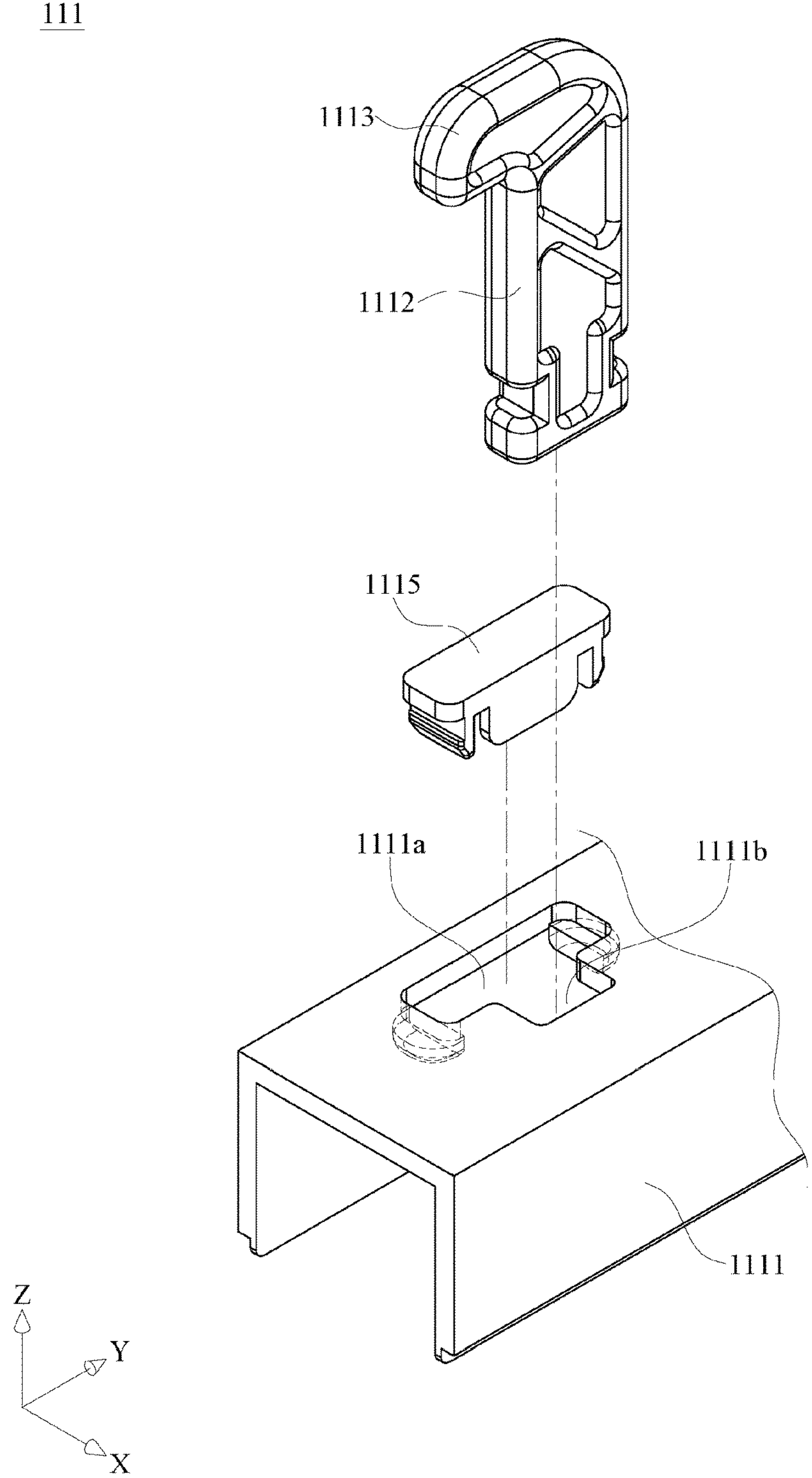
FIG. 2B is an exploded schematic diagram of a slidable engaging member in FIG. 2A.
Figure 3A:
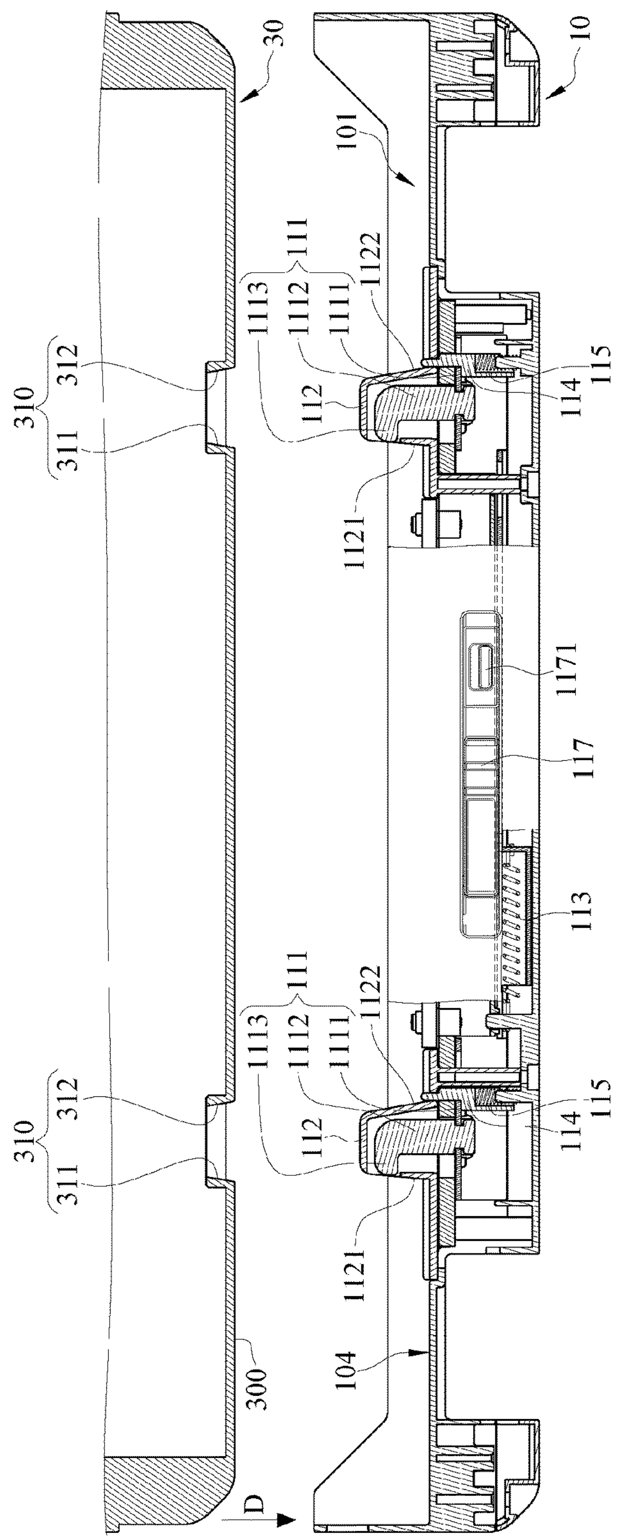
FIG. 3A is a sectional schematic diagram of the electronic apparatus in FIG. 1.
Figure 3B:
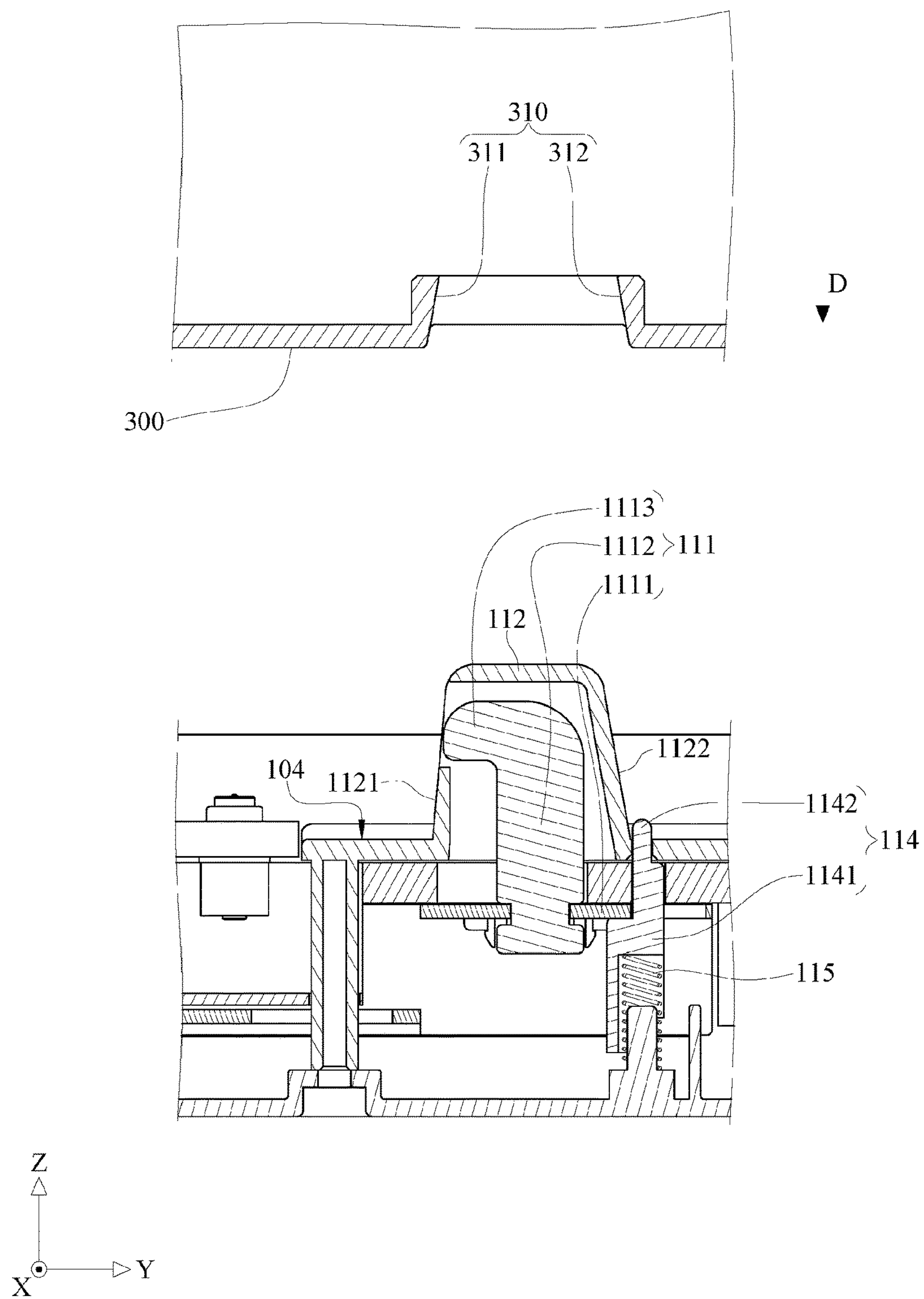
FIG. 3B is an enlarged partial schematic diagram of FIG. 3A.
Figure 3C:
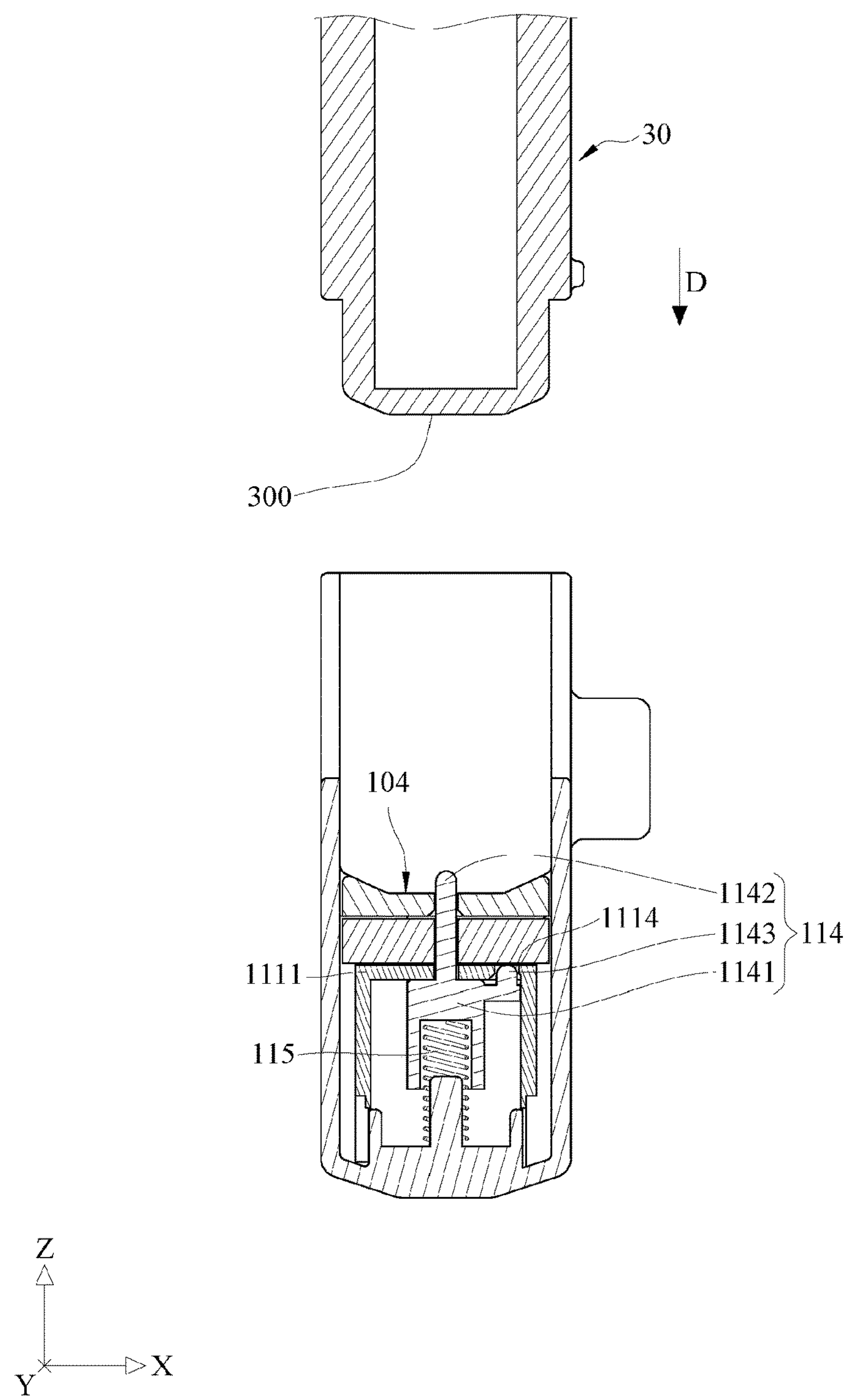
FIG. 3C is a sectional schematic diagram of the electronic apparatus in FIG. 1 from another viewing angle.

Refer to FIG. 1 to FIG. 3C. FIG. 1 shows a perspective schematic diagram of an electronic apparatus according to an embodiment of the present invention. FIG. 2A is an exploded schematic diagram of a transmission dock in FIG. 1. FIG. 2B is an exploded schematic diagram of a slidable engaging member in FIG. 2A. FIG. 3A is a sectional schematic diagram of the electronic apparatus in FIG. 1. FIG. 3B is an enlarged partial schematic diagram of FIG. 3A. FIG. 3C is a sectional schematic diagram of the electronic apparatus in FIG. 1 from another viewing angle.

An electronic apparatus 1 according to an embodiment includes a transmission dock 10, a first electronic device 30 and a second electronic device 50. Two slidable frames 310 on a connecting side 300 of the first electronic device 30 can electrically connect to the transmission dock 10 along a carrying direction D. The transmission dock 10 is pivotally disposed at the second electronic device 50.

In this embodiment, the first electronic device 30 is a tablet computer and the second electronic device 50 is a keyboard, for example but not limited to. In other embodiments, the first electronic device may be other electronic devices having a display function, and the second electronic device may be an electronic device having an instruction input function such as a physical keyboard or a virtual keyboard.

The transmission dock 10 includes a seat 100, an engaging mechanism 110 and a connection port 120. The seat 100 has an accommodating groove 101 for accommodating the connecting side 300. The engaging mechanism 110 and the connection port 120 are disposed at the seat 100.

The seat 100 includes a base portion 102 and an assembly portion 103. The assembly portion 103 is disposed in the base portion 102, and the two jointly form a carrying surface 104 at the bottom of the accommodating groove 101.

The engaging mechanism 110 includes two slidable engaging members 111, two guiding frames 112, a first elastic member 113, two pressing members 114, two second elastic members 115, a linking member 116 and a button 117.

Each of the two slidable engaging members 111 includes a sliding element 1111, an arm 1112, a hook portion 1113 and a blocking engaging element 1115. The two sliding elements 1111 are slidably disposed at the base portion 102 of the seat 100, and each has a long assembly hole 1111*a* and a short assembly hole 111*b* that are connected to each other, with the length of the long assembly hole 1111*a* in the Y-axis direction being greater than that of the short assembly hole 1111*b*. The two arms are respectively insertingly disposed at the two short assembly holes 1111*b* of the two sliding elements 1111. The two hook portions 1113 respectively protrude from the two arms 1112. The two blocking engaging elements 1115 respectively cover the two long assembly holes 1111*a*.

In this embodiment, to install the arm 1112 connected to the hook portion 1113 to the sliding element 1111, the arm 1112 is first penetrated through the long assembly hole 1111*a* of the sliding element 1111 to cause the arm 1112 and the hook portion 1113 to protrude from the sliding element 1111. The arm 1112 is then levelly moved to engage the arm 1112 from the long assembly hole 1111*a* into the short assembly hole 1111*b*. The blocking engaging element 1115 is caused to cover the long assembly hole 1111*a* to stop the arm 1112 so as to fix the arm 1112 at the position of the short assembly hole 1111*b*. Thus, the assembly of the slidable engaging member 111 is completed.

The two guiding frames 112 are fixedly protrudingly disposed at the carrying surface 104 at the bottom of the accommodating groove 101. The hook portion 1113 of each slidable engaging member 111 is covered by the guiding frame 112 when the hook portion 1113 is in a releasing state, and protrudes from one side of two opposite outer sides 1121 and 1122 of the guiding frame 112 when the hook portion 1113 is in an engaging state. As such, during the processing of connecting the first electronic device 30 and the transmission dock 10, the slidable engaging member 111 is prevented from direct collisions of the first electronic device 30 and hence from damages.

In this embodiment, in the engaging state, the two hook portions 1113, for example but not limited to, both protrude from the outer sides 1121 of the two guiding frames 112, respectively. Further, the releasing state and the engaging state respectively describe position states of the hook portion 1113 of the slidable engaging member 111 relative to the guiding frame 112 when the first electronic device 30 and the transmission dock 10 are separated and joined, respectively.

Each of the two pressing members 114 includes a body portion 1141, a pressed portion 1142 and a limiting portion 1143. The two body portions 1141 are slidably disposed next to the two slidable engaging members 111, and have a sliding direction (as the Z-axis direction shown) substantially orthogonal to the sliding direction (as the Y-axis direction shown) of the slidable engaging members 111. The pressed portions 1142 and the limiting portions 1143 are connected to the body portions 1141. The two second elastic members 115 are, for example, compression springs, and each has one end thereof connected to the base portion 102 and the other end thereof connected to the body portion 1141 of the pressing member 114. When the hook portion 1113 is restrained in the releasing state, the pressing member 114 is pressed by the second elastic member 115 to cause the pressed portion 1142 to protrude from the carrying surface 104, and to cause the limiting portion 1143 to locate at a limiting position to further insert into a limiting hole 1114 of the sliding element 1111. When the slidable frame 310 on the connecting side 300 is located at the carrying surface 104, the slidable frame 310 presses the pressed portion 1142 downwards to cause the limiting portion 1143 to disengage from the limiting hole 1114 of the sliding element 1111, to further cause the hook portion 1113 to switch from the releasing state to the engaging state.

In this embodiment, the slidable engaging members 111, the guiding frames 112, the pressing members 114, the second elastic members 115 and the slidable frames 310 are all in a quantity of two, for example but not limited to. In other embodiments, the quantities of the foregoing components may be one or more than three.

The linking member 116 is connected to the two slidable engaging members 111. The first elastic member 113 is, for example, a tension spring, and has one end thereof connected to the base portion 102 of the seat 100 and the other end thereof connected to the linking member 116. Thus, through the first elastic member 113, the two slidable engaging members 111 are driven to normally incline towards the engaging state. That is to say, when the restraint of the pressing members 114 upon the slidable engaging members 111 is released, the first elastic member 113 moves the slidable engaging members 111 to locate the slidable engaging members 111 at the engaging state. In this embodiment, the two sliding elements 1111 of the two slidable engaging members 111 and the linking member 116 are designed as an integral, for example but not limited to.

The button 117 is disposed on the linking member 116, and is intermittently connected to the two sliding elements 1111 of the two slidable engaging members 111 through the linking member 116, so as to drive the two hook portions 1113 to switch from the engaging state to the releasing state.

In this embodiment, the first elastic member 113 has one end thereof connected to the base portion 102 of the seat 100 and the other end thereof connected to the linking member 116, so as to be indirectly connected to the two slidable engaging members 111 by the linking member 116 to simultaneously drive the two slidable engaging members 111 to move levelly, for example but not limited to. In other embodiments, the first elastic member 113 may be directly connected to the sliding elements 1111 of the slidable engaging members 111, for example.

Further, in this embodiment, the button 117 is disposed on the linking member 116, so as to indirectly drive the two hook portions 113, through two linking member 116, from the engaging state to the releasing state, for example but not limited to. In other embodiment, the button may be directly disposed on the sliding element, for example.

The connection port 120 is disposed at the assembly portion 103 of the seat 100, and is located on the carrying surface 104 as well as between the two pressing members 114. The connection port 120 is for electrically connecting to a connection port (not shown) of the first electronic device 30. In this embodiment, the two pressing members 114 are respectively at the two opposite sides of the connection port 120 to ensure that the two hook portions 1113 are engaged into the two slidable frames 310 only when the two hook portions 1113 are respectively aligned with the two slidable frames 310, thus preventing intended collisions between the hook portions 1113 and the slidable frames 310 and to prevent the hook portions 1113 from damages. More specifically, when the first electronic device 30 is pressed upon both of the two pressing members 114 at the two opposite sides of the connection port 120, it means that the first electronic device 30 is not oblique and the two hook portions 1113 are respectively aligned with the two slidable frames 310. Thus, when the two pressing members 114 are both pressed and the restraint from the two limiting portions 1143 of the two pressing members 114 upon the two sliding elements 1111 is released, the two hook portions 1113 can respectively engage into the two slidable frames 310 under the premise that the two hook portions 1113 are already aligned with the two slidable frames 310.

Conversely, when the first electronic device 30 presses only one of the pressing members 114, it means that the first electronic device 30 is oblique, and at least one of the hook portions 1113 is not aligned with the slidable frame 310. However, pressing only one of the pressing members 114 is not sufficient for engaging the two hook portions 1113 into the two slidable frames 310. Thus, by locating the two pressing members 114 at the two opposite sides of the connection port 120, it is ensured that the two hook portions 1113 are respectively engaged into the two slidable frames 310 only when the two hook portions 1113 are aligned with the two slidable frames 310, further preventing damages of the hook portions 1113.

Figure 4A:
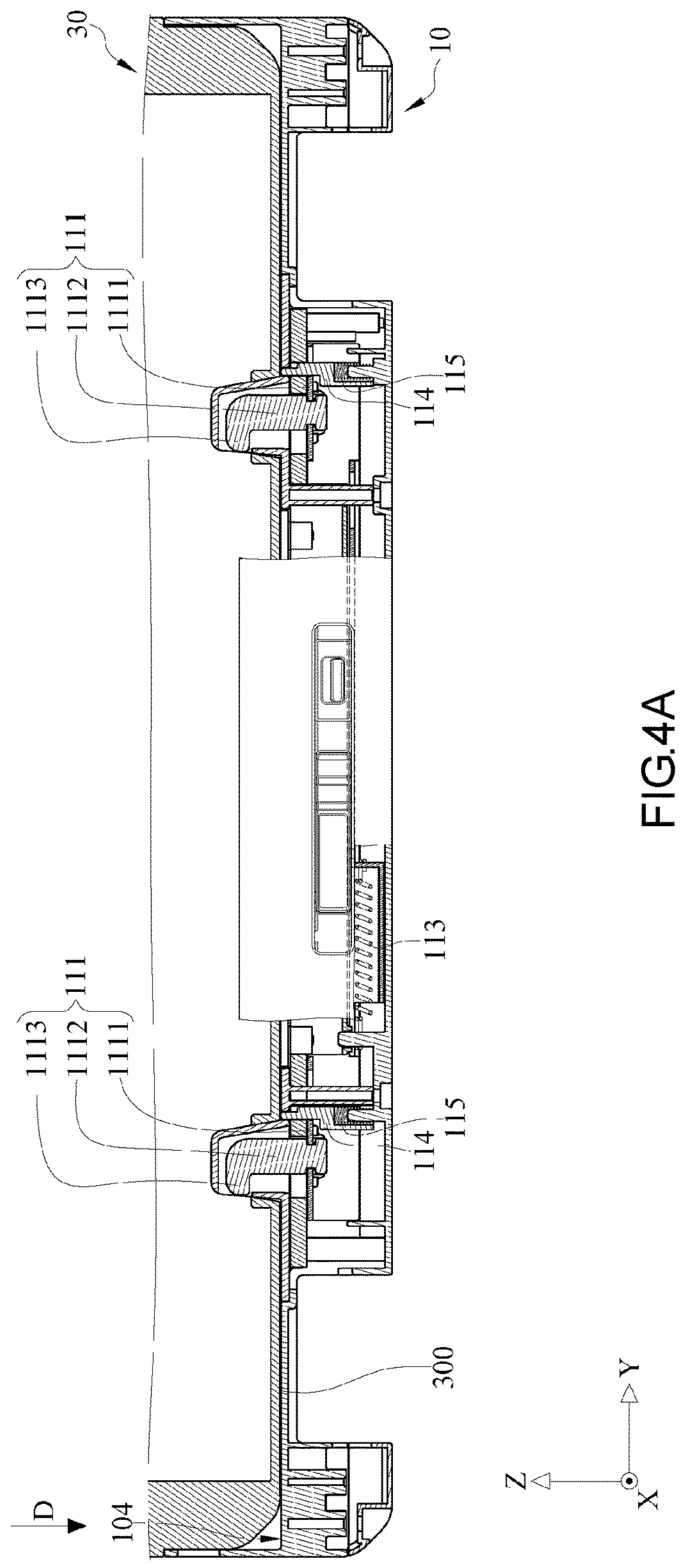
FIG. 4A is a sectional schematic diagram of a first electronic device in FIG. 1 inserted to a transmission dock along a carrying direction.
Figure 4B:
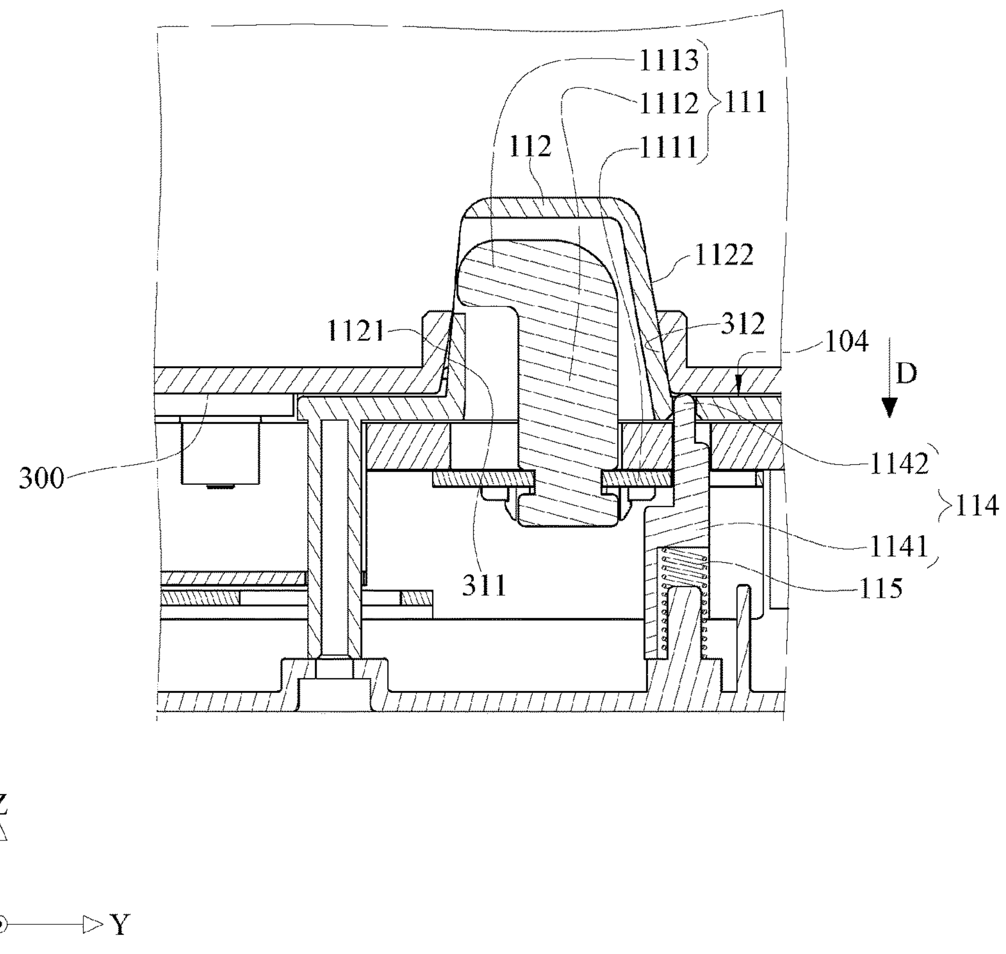
FIG. 4B is an enlarged partial schematic diagram of FIG. 4A.
Figure 4C:
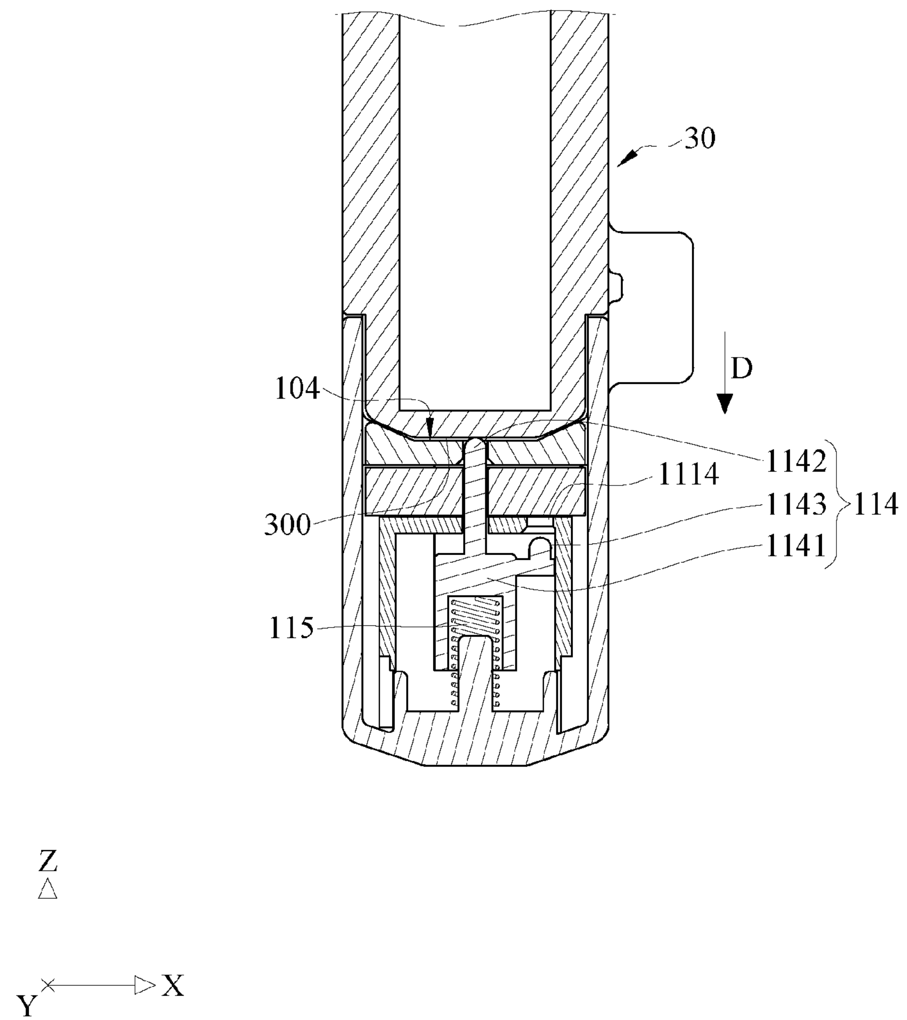
FIG. 4C is a sectional schematic diagram of the first electronic device in FIG. 1 inserted to a transmission dock along a carrying direction from another viewing angle.
Figure 5A:
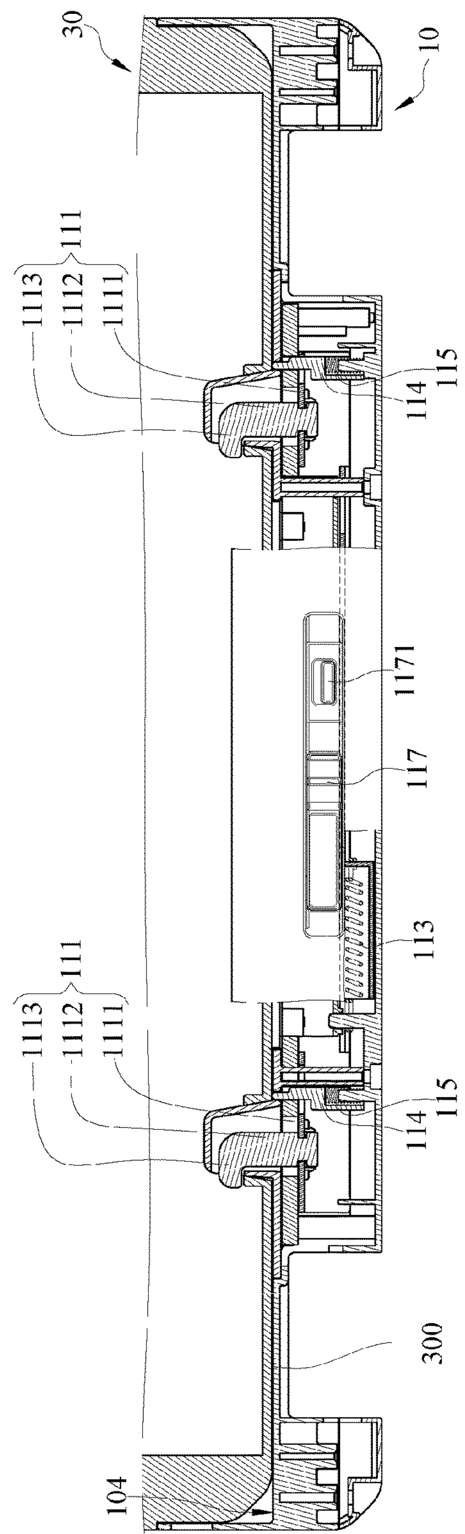
FIG. 5A is a sectional schematic diagram of a hook portion of a slidable engaging member in FIG. 1 in an engaging state.
Figure 5B:
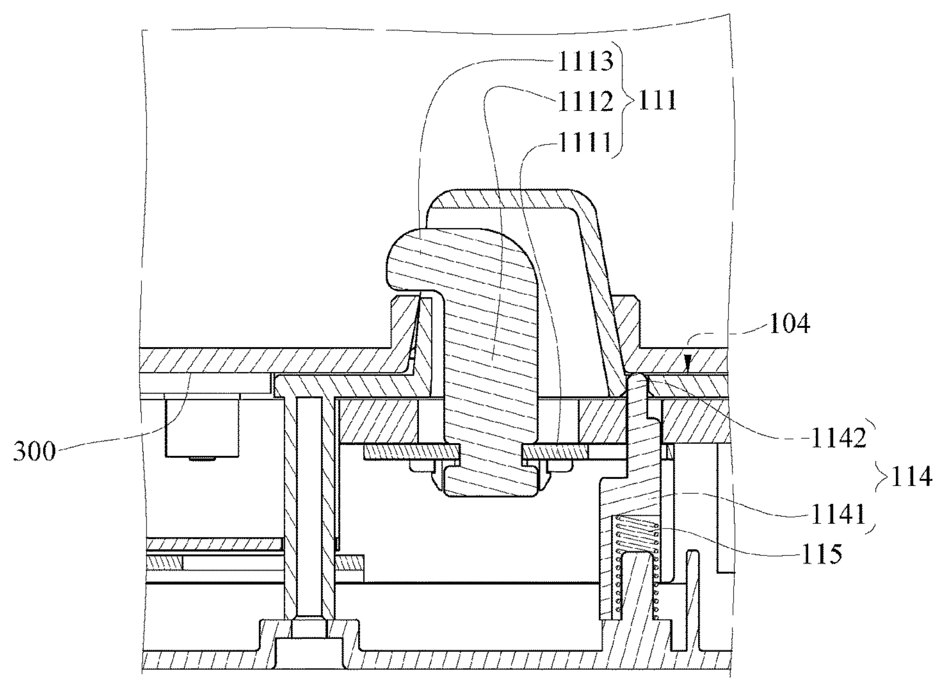
FIG. 5B is an enlarged partial schematic diagram of FIG. 5A.

Refer to FIG. 3A to FIG. 5B. FIG. 4A is a sectional schematic diagram of the first electronic device in FIG. 1 inserted into the transmission dock along a carrying direction. FIG. 4B is an enlarged partial schematic diagram of FIG. 4A. FIG. 5C is a sectional schematic diagram of the first electronic device in FIG. 1 inserted into the transmission dock along a carrying direction from another viewing angle. FIG. 5A is a sectional schematic diagram of the hook portions of slidable engaging members in FIG. 1 in an engaging state. FIG. 5B is an enlarged partial schematic diagram of FIG. 5A.

FIG. 3A to FIG. 3C show a state in which the first electronic device 30 is not yet connected to the transmission dock 10. At this point, the hook portion 1113 is in the releasing state. To combine the first electronic device 30 with the transmission dock 10, the first electronic device 30 is inserted along the carrying direction D into the accommodating groove 101 of the seat 100, and the first electronic device 30 is more accurately guided to the engaging position through pressing the two opposite inner sides 311 and 312 of the slidable frame 310 against the two opposite outer sides 1121 and 1122 of the guiding frame 112, such that the slidable frame 310 on the connecting side 300 is located on the carrying surface 104.

FIG. 4A to FIG. 4C show a state in which the first electronic device 30 is placed levelly at the transmission dock 10, the two slidable frames 310 are simultaneously located on the carrying surface 104, and the two pressed portions 1142 of the two pressing members 114 are simultaneously pressed downwards. As show in FIG. 4C, at this point, the limiting portion 1143 of the pressing member 114 is disengaged from the limiting hole 1114 of the sliding element 1111, such that the slidable engaging member 111 is bounced or moved obliquely from the engaging state through the first elastic member 113, or the slidable engaging member 111 is engaged back to the releasing state by moving the button 117. FIG. 5A and FIG. 5B show a state in which the two slidable engaging members 111 are connected to the two slidable frames 310. More specifically, when the two limiting portions 1143 are simultaneously disengaged from the two limiting holes 1114, the first elastic member 113 drives the two slidable engaging members 111 through the linking member 116 to locate the two slidable engaging members 111 at the engaging state. At this point, the two hook portions 1113 protrude from the outer sides 1121 of the two guiding frames 112 so as to connect to the two slidable frames 310.

Figure 6:
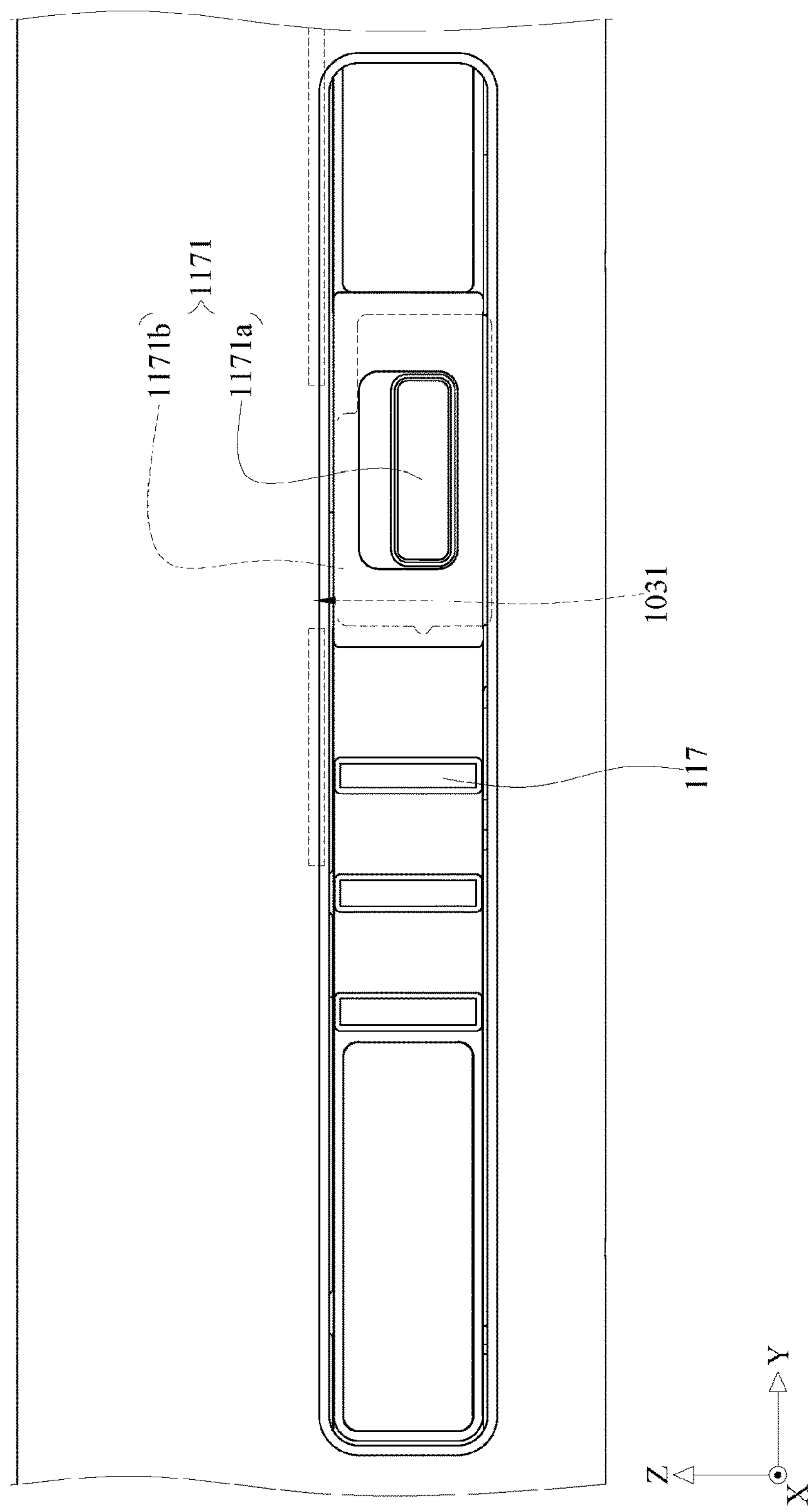
FIG. 6 is a schematic diagram of a safety element in FIG. 5A at an unlocking position.
Figure 7:
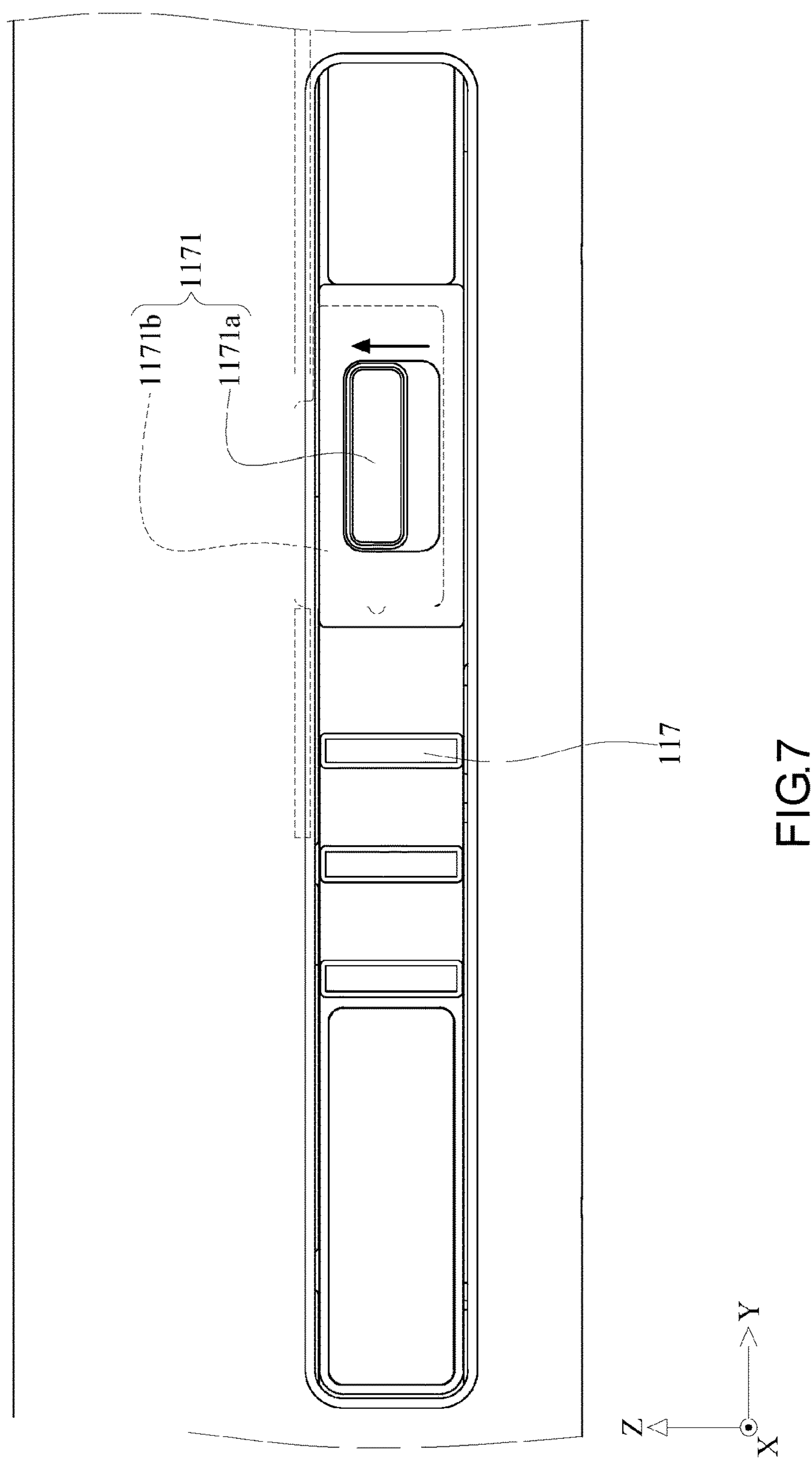
FIG. 7 is a schematic diagram of the safety element in FIG. 6 levelly moved to a locking position.
Figure 8:
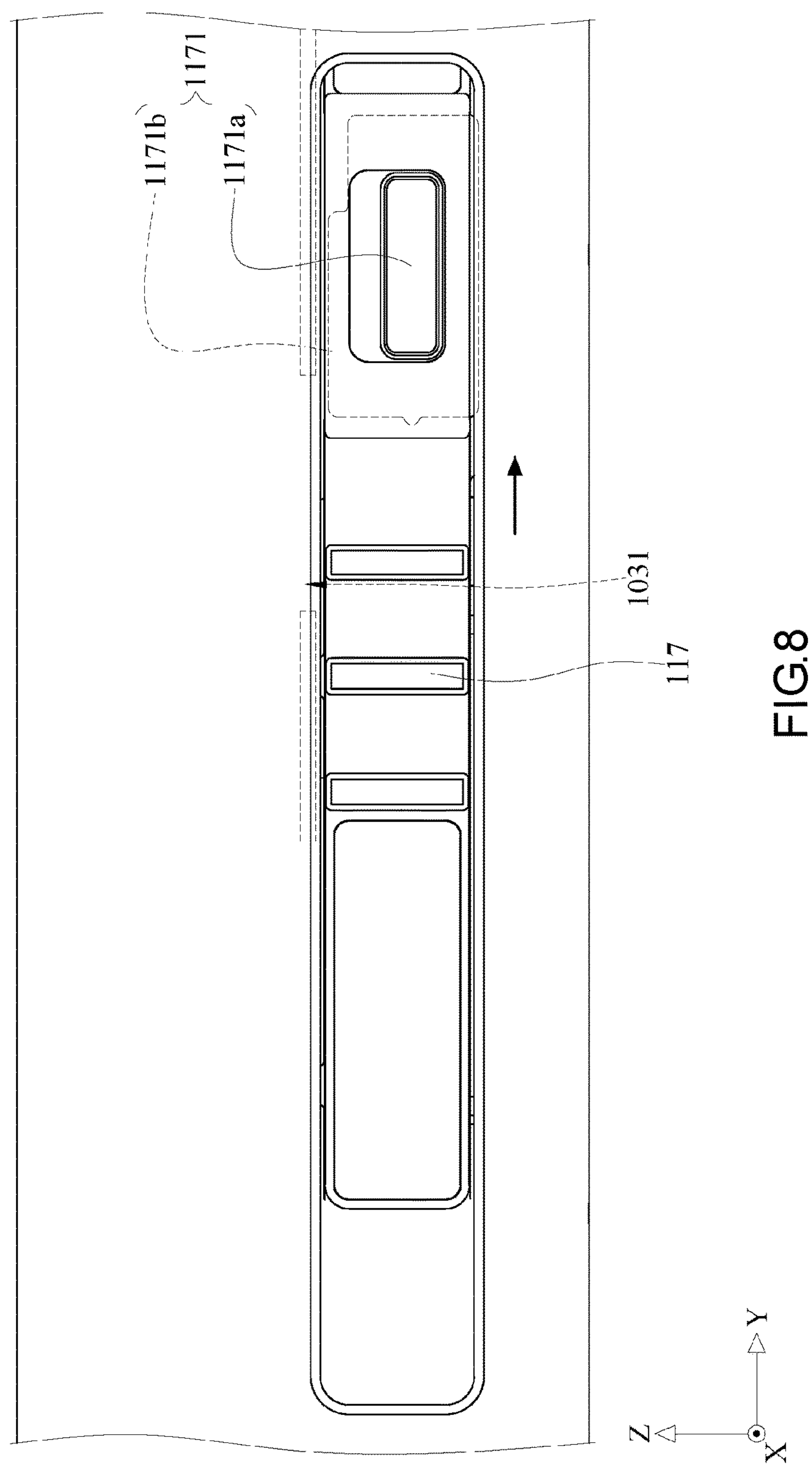
FIG. 8 is a schematic diagram of a button in FIG. 6 levelly moved to a releasing position.

Further, when the first elastic member 113 drives the linking member 116 to cause the two slidable engaging members 111 to locate at the engaging state, the button 117 disposed on the linking member 116 is also driven to levelly move from a releasing position to a joining position. At this point, through a safety element 1171, the button 117 may be locked at the joining position, so as to prevent from erroneously triggering the button 117 and thus accidentally disengaging the first electronic device 30 from the transmission dock 10. More specifically, refer to FIG. 6 to FIG. 8, FIG. 6 is a schematic diagram of a safety element at an unlocking position. FIG. 7 is a schematic diagram of the safety element levelly moved to a locking position. FIG. 8 is a schematic diagram of the button in FIG. 6 levelly moved to a releasing position. The safety element 1171 may be slidably disposed at the button 117, and has a sliding direction substantially orthogonal to a levelly moving direction of the button 117. The safety element 1171 includes an operation protrusion 1171*a* and a limiting protrusion 1171*b*. The operation protrusion 1171*a* is adapted to be pushed by a user to slide the safety element 1171 to an unlocking position or a locking position. The limiting protrusion 1171*b* can be driven by the operation protrusion 1171*a* to levelly move to engage into or disengage from a limiting channel 1031 of the assembly portion 103 of the seat 100. When the operation protrusion 1171*a* is actuated to cause the safety element 1171 to locate the locking position (as shown in FIG. 7), the limiting protrusion 1171*b* is engaged into the limiting channel 1031 to cause the button 117 to be locked at the joining position; when the operation protrusion 1171*a* is actuated to cause the safety element 1171 to locate at the unlocking position (as shown in FIG. 6), the limiting protrusion 1171*b* is disengaged from the limiting channel 1031 to release the restraint upon the button 117, such that the button 117 is actuated to levelly move from the joining position to the releasing position (as shown in FIG. 8).

When the user wishes to remove the first electronic device 30 from the transmission dock 10, the restraint of the safety element 1171 upon the button 117 can be first released. That is, the safety element 1171 is slid to the unlocking position, and the button 117 is levelly moved from the joining position to the releasing position, so as to also drive the first elastic member 113 and the linking member 116 to further drive the two slidable engaging members 111 to locate the two slidable engaging members 111 at the releasing state (as shown in FIG. 4A). Next, the first electronic device 30 is removed along a direction opposite the carrying direction D. At this point, the two pressing members 114 are pressed by the second elastic members 115 to cause the pressed portions 1142 to protrude from the carrying surface 104, and to cause the limiting portions 1143 to insert into the limiting holes 1114 of the sliding elements 1111 to return to the limiting position (as shown in FIG. 3C).

In this embodiment, the engaging mechanism 110 is exemplified by two slidable engaging members 111, and the present invention is not limited thereto. In other embodiment, the engaging mechanism may be, for example, a fixed engaging member and a slidable engaging member. For example, the fixed engaging member is a hook portion. The first electronic device first aligns with the slidable frames with the fixed engaging member, and is engaged from an oblique open position. The first electronic device is then rotated to a horizontal position to correspond the other slidable frame with the guiding frame of the slidable engaging member to locate on the carrying surface, and the pressing member is pressed downwards to activate the engaging mechanism.

According to the engaging mechanism as well as the transmission dock and the electronic apparatus having the engaging mechanism in the above embodiments, during the process of connecting the first electronic device and the transmission dock, the two opposite inner sides of the slidable frame on the connecting side of the first electronic device are pressed against the two opposite outer sides of the guiding frame, and the first electronic device can be more accurately guided to the fastening positioning to locate the slidable frame at the carrying surface. Further, by covering the hook portions of the slidable engaging members by the guiding frames of the engaging mechanism, the slidable engaging members are prevented from direct collisions with the first electronic device and thus from damages.

Further, by limiting the sliding elements by the pressing members, it is ensured that, only when the slidable frames are located on the carrying surface and the pressing members are pressed downwards to remove the limiting portions of the pressing members from the limiting holes of the sliding elements, the slidable engaging members are switched from the releasing state to the engaging state to join with the slidable frames. Thus, it is ensured that, during the process of connecting the first electronic device and the transmission dock, the hook portions of the slidable engaging members are removed from the guiding frames only when the slidable frames and the guiding frames are aligned, thus preventing collisions caused when the slidable frames and the guiding frames are not properly aligned and hence from damages of the hook portions and the slidable frames.

Further, when the quantity of the slidable engaging members of the engaging mechanism is two and the two slidable engaging members are respectively located at the two opposite sides of the connection port, it is effectively ensured that, during the process of connecting the first electronic device and the transmission dock, only when the first electronic device is levelly placed on the carrying surface of the transmission dock, the restraint of the limiting portions of the two pressing members upon the two sliding elements is released, such that the first electronic device and the transmission dock can be properly joined to prevent collisions of the hook portions and the slidable frames.

While the invention has been described in terms of what is presently considered to be the most practical and preferred embodiments, it is to be understood that the invention is only illustrative and needs not to be limited to the above embodiments. It should be noted that, equivalent variations and replacements made to the embodiments are to be encompassed within the scope of the present invention. Therefore, the scope of the present invention is to be accorded with the appended claims.

What is claimed is:

1. An engaging mechanism, adapted to be disposed on a carrying surface, comprising:

- at least one slidable engaging member, comprising a sliding element, an arm and a hook portion, the arm installed at the sliding element, the hook portion protruding from the arm;
- at least one guiding frame, configured for fixing on and protruding from the carrying surface, the hook portion covered by the at least one guiding frame when the hook portion is in a releasing state and protruding from one of two opposite outer sides of the at least one guiding frame when the hook portion is in an engaging state;
- at least one slidable frame, wherein, when the hook portion is in the releasing state, two opposite inner sides of the at least one slidable frame press against the two opposite outer sides to locate the at least one slidable frame at the carrying surface along a carrying direction, and the hook portion switches from the releasing state to the engaging state to be connected to the at least one slidable frame;
- a first elastic member arranged to cause the at least one slidable engaging member to incline towards the engaging state; and
- a pressing member and a second elastic member, the pressing member comprising a body portion, a pressed portion and a limiting portion, the body portion slidably disposed next to the at least one slidable engaging member, a sliding direction of the body portion substantially being orthogonal to a sliding direction of the at least one slidable engaging member, and the pressed portion and the limiting portion connected to the body portion;
- wherein, when the hook portion is restrained in the releasing state, the pressing member is pressed by the second elastic member to cause the pressed portion to protrude from the carrying surface and to cause the limiting portion to be at a limiting position by being inserted into a limiting hole of the sliding element, and when the at least one slidable engaging member is located at the carrying surface, the at least one slidable frame presses the pressed portion downwards to cause the limiting portion to disengage from the limiting hole of the sliding element and to allow the hook portion to switch from the releasing state to the engaging state.

2. A transmission dock, at least one slidable frame on a connecting side of a first electronic device being adapted to electrically connect to the transmission dock along a carrying direction, the transmission dock comprising:

- a seat, having an accommodating groove for accommodating the connecting side;
- at least one slidable engaging member, comprising a sliding element, an arm and a hook portion, the hook portion installed at the sliding element, the hook portion protruding from the arm;
- at least one guiding frame, fixedly protrudingly disposed at a carrying surface substantially located at a bottom of the accommodating groove, the hook portion covered by the at least one guiding frame when the hook portion is in a releasing state and protruding from one of two opposite outer sides of the at least one guiding frame when the hook portion is in an engaging state, wherein, when the hook portion is in the releasing state, two opposite inner sides of the at least one slidable frame press against the two opposite outer sides to locate the at least one slidable frame at the carrying surface along a carrying direction, and the hook portion of the at least one slidable engaging member is actuated to engage with the at least one slidable frame;
- a first elastic member arranged to cause the at least one slidable engaging member to incline towards the engaging state; and
- a pressing member and a second elastic member, the pressing member comprising a body portion, a pressed portion and a limiting portion, the body portion slidably disposed next to the at least one slidable engaging member, a sliding direction of the body portion substantially being orthogonal to a sliding direction of the at least one slidable engaging member, and the pressed portion and the limiting portion connected to the body portion;
- wherein, when the hook portion is restrained in the releasing state, the pressing member is pressed by the second elastic member to cause the pressed portion to protrude from the carrying surface and to cause the limiting portion to be at a limiting position by being inserted into a limiting hole of the sliding element, and when the at least one slidable engaging member is located at the carrying surface, the at least one slidable frame presses the pressed portion downwards to cause the limiting portion to disengage from the limiting hole of the sliding element and to allow the hook portion to switch from the releasing state to the engaging state.

3. The transmission dock according to claim 1, further comprising a connection port; wherein, the quantity of the at least one pressing member is two, and the connection port is located between the two pressing members.

4. The transmission dock according to claim 1, further comprising a button connected to the sliding element to drive the hook portion to switch from the engaging state to the releasing state.

5. The transmission dock according to claim 4, further comprising a linking member; wherein, the quantity of the at least one slidable engaging member is two, the linking member connects the two slidable engaging members, and the button is connected to the sliding element through the linking member, so as to drive the two slidable engaging members through to first elastic member to incline towards the engaging state.

6. An electronic apparatus, comprising:

a transmission dock;

a first electronic device, at least one slidable frame on a connecting side of the first electronic device adapted to electrically connect to the transmission dock; and a second electronic device, the transmission dock pivotally disposed at the second electronic device;

wherein, the transmission dock comprises:

a seat, having an accommodating groove for accommodating the connecting side;

at least one slidable engaging member, comprising a sliding element, an arm and a hook portion, the hook portion installed at the sliding element, the hook portion protruding from the arm;

at least one guiding frame, fixedly protrudingly disposed at a carrying surface substantially located at a bottom of the accommodating groove, the hook portion covered by the at least one guiding frame when the hook portion is in a releasing state and protruding from one of two opposite outer sides of the at least one guiding frame when the hook portion is in an engaging state, wherein, when the hook portion is in the releasing state, two opposite inner sides of the at least one slidable frame press against the two opposite outer sides to locate the at least one slidable frame at the carrying surface along a carrying direction, and the hook portion of the at least one slidable engaging member is actuated to engage with the at least one slidable frame;

a first elastic member arranged to cause the at least one slidable engaging member to incline towards the engaging state; and a pressing member and a second elastic member, the pressing member comprising a body portion, a pressed portion and a limiting portion, the body portion slidably disposed next to the at least one slidable engaging member, a sliding direction of the body portion substantially being orthogonal to a sliding direction of the at least one slidable engaging member, and the pressed portion and the limiting portion connected to the body portion;

wherein, when the hook portion is restrained in the releasing state, the pressing member is pressed by the second elastic member to cause the pressed portion to protrude from the carrying surface and to cause the limiting portion to be at a limiting position by being inserted into a limiting hole of the sliding element, and when the at least one slidable engaging member is located at the carrying surface, the at least one slidable frame presses the pressed portion downwards to cause the limiting portion to disengage from the limiting hole of the sliding element and to allow the hook portion to switch from the releasing state to the engaging state.

* * * * *